(12) United States Patent
Lee

(10) Patent No.: US 6,751,488 B2
(45) Date of Patent: Jun. 15, 2004

(54) APPARATUS FOR OPERATING THE COVER OF A FOLDING TYPE MOBILE DEVICE

(75) Inventor: In Ho Lee, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 608 days.

(21) Appl. No.: 09/832,653

(22) Filed: Apr. 11, 2001

(65) Prior Publication Data

US 2002/0025787 A1 Feb. 28, 2002

(30) Foreign Application Priority Data

Aug. 24, 2000 (KR) .......................................... 2000-49166

(51) Int. Cl.[7] .............................................. H04M 1/00
(52) U.S. Cl. ................................. 455/575.3; 455/550.1; 455/90.3; 379/433.13
(58) Field of Search ............................ 455/550.1, 575.3, 455/90.3, 575.1, 575.8; 379/433.13

(56) References Cited

U.S. PATENT DOCUMENTS 5,799,079 A * 8/1998 Inoue .................... 379/433.13
5,923,751 A * 7/1999 Ohtsuka et al. ........ 379/433.13
6,011,699 A * 1/2000 Murray et al. ............... 361/814

* cited by examiner

Primary Examiner—Nguyen T. Vo
Assistant Examiner—Alemayehu Behulu
(74) Attorney, Agent, or Firm—Darby & Darby

(57) ABSTRACT

Disclosed herein is an apparatus for operating the cover of a mobile device. The apparatus includes a cylindrical housing formed on one end of the device cover. The cylindrical housing accommodates an operating means. The cylindrical housing has a projection at its first side and is open at its second side. Two holding projections are integrated with a device body, have opposite holding recesses and rotatably support the cylindrical housing. A hinge shaft is connected to the output end of the operating means, the cam portion of which is inserted into one of the holding recesses. Elasticity means is situated in the holding recess into which the cam portion is inserted for exerting a predetermined amount of elastic force on the cam portion. A switch is formed on one side of the device body for applying an operating signal to the operating means. Position sensing means is comprised of a brush housing and a rectification housing attached to the operating means and the hinge shaft at opposite positions for detecting the same phase state when the first and second patterns are electrically connected and applied with electricity at certain positions by the brush.

13 Claims, 7 Drawing Sheets

APPARATUS FOR OPERATING THE COVER OF A FOLDING TYPE MOBILE DEVICE

BACKGROUND OF THE INVENTION

1. Field of the Invention

The present invention relates generally to a folding type mobile device that allows its cover to be selectively opened and closed automatically and manually, and more particularly to an apparatus for operating the cover of a folding type mobile device, which is capable of selectively and stably opening and closing the cover of the folding type mobile device by compensating for a change in the output characteristics of the apparatus and a difference in phase due to load, using the control of the position of the cover.

2. Description of the Prior Art

In general, mobile communications may be classified into the following categories; direct communications among moving stations (such as, radio transmitter-receiver), communications between a base station and multiple moving stations (such as, MCA radio communications), and communications selecting a neighboring base station among multiple base stations (such as, automobile devices). Recently, there have been commercialized Personal Digital Assistants (PDAs), smart devices and Hand-held Personal Computers (HPCs), which allow data transmission and reception to be performed through compute work and network access using portable peripheral devices, regardless of locations.

The mobile devices can be easily carried and conveniently used, so a demand for mobile devices has tremendously increased. In order to meet the various desires of consumers, the mobile devices are miniaturized and have become multifunctional.

In general, the mobile devices may be classified into three types according to their shapes; a bar type in which push buttons are exposed to the outside, a flip type in which push buttons are covered with a flip, and a folding type in which a device body is folded in half. With the trend toward miniaturization, folding type mobile devices have been widely utilized.

FIG. 1 is a perspective view showing a general folding type mobile phone used as a mobile communication terminal.

The conventional folding type mobile device 100 is basically comprised of a body 110 and a cover 120.

The device body 110 includes a variety of push buttons, a microdevice, various parts for the transmission and reception of voice, and a battery pack for power supply. The cover 120 includes a display window for indicating call and function information, a speaker and a variety of parts.

In such a folding type mobile device, the cover 120 is hingedly attached to the device body 110 at its one edge. The mobile device 100 is opened or closed by the rotation of the cover 120 in a forward or reverse direction.

In general, the opening and closing of the cover 120 of the mobile device 100 is carried out in the basis of a structure illustrated in FIG. 2.

In the conventional folding type mobile device 100, a hollow cylindrical housing 111 is formed on the lower end of the cover 120. A coil spring 112 is arranged in the center portion of the housing 111 with its one end supported on the housing 111 and its other end kept free. A male coupling member 113, the outer side of which is wedge-shaped, is secured to the free end of the coil spring 112.

A female coupling member 114 having a wedge-shaped groove and a connecting projection 115 is situated to engage with the male coupling member 113 having a wedge-shaped projection, with the wedge-shaped groove of the female coupling member 114 engaging with the wedge-shaped projection of the male coupling member 113.

The male coupling member 113 and the female coupling member 114 serve as a hinge shaft. When the cover 120 is rotated together with the male coupling member 113, the rotational direction of the female coupling member 114 is restricted by the fixing groove of the fixing portion formed on the device body 110. If the male coupling member 113 is rotated at an angle of a predetermined value or more, the male coupling member 113 causes the coil spring 112 to be pushed while being compressed, as shown in FIG. 3.

As a result, when the cover 120 is opened and the rotational angle of the male coupling member 113 is less than the wedge angle of the male and female coupling members 113 and 114, the male coupling member 113 is forcibly engaged with the female coupling member 114 by the elastic force of the coil spring 112 so that the cover 120 is returned to its closed position and kept at that position. When the rotational angle of the male coupling member 113 is greater than the wedge angle, the male coupling member 113 is rotated at about 180° so that the male coupling member 113 is engaged with the female coupling member 114, thereby allowing the cover 120 to be kept open.

On the contrary, when the cover 120 is closed, the rotational angle of the male coupling member 113 is less than the wedge angle of the male and female coupling members 113 and 114, the restoring force of the coil spring 112 is exerted on the male and female coupling members 113 and 114 so the cover 120 is forcibly kept open. When the rotational angle of the male coupling member 113 is greater than the wedge angle, the male coupling member 113 is rotated so that the male coupling member 113 is engaged with the female coupling member 114, thereby causing the cover 120 to be closed.

However, the conventional folding type mobile device is inconvenient in that its cover 120 has to be opened with one hand while its body 110 is held by the other hand because the cover 120 is relatively heavy.

In order to overcome the above-described shortcoming, there have been proposed various folding type mobile devices that are capable of being easily opened and closed with one hand. One example of the mobile devices is the type in which its cover is opened and closed by an operating apparatus.

In this type mobile device, its cover 120 is automatically opened and closed using the operating apparatus manipulated with one hand. In this case, the cover 120 should be opened and closed manually as well as automatically.

FIG. 4 is a partially sectional view showing a principal portion of another conventional folding type mobile device with an operating apparatus. As illustrated in the drawing, the operating apparatus is comprised of a motor 116 elastically supported by a coil spring 112 and a gear box 117 connected to the output end of the motor 116.

The motor 116 is operated, together with a switch manipulated by a user, and generates operating force for a time period set by a timer.

The gear box 117 is connected to the output end of the motor 116, and serves to reduce the rotating ratio and prevent reversion. A male coupling member 113 is attached to the output end of the gear box 117, and engaged with the female coupling member 114.

In the conventional mobile device, when the switch is manipulated to automatically open the cover 120, the male coupling member 113 is engaged with the female coupling member 114, so the body of the motor 116 is rotated around its central axis. The cover 120, provided with the housing 111 on which the motor 116 is mounted, is rotated for a predetermined time period, thereby opening the cover 120 away from the device body 110.

On the contrary, when the switch is manipulated so as to close the cover 120, the body of the motor 116 is rotated around the central axis in the opposite direction, the cover 120 is rotated in the opposite direction, thereby causing the cover 120 to be closed.

In the meantime, when the cover 120 is manually rotated in a direction or the opposite direction to be opened or closed, slippage occurs between the male coupling member 113 and the female coupling 114 and the coil spring 112 is compressed by the male coupling member 113 and the motor 116. Accordingly, while the coil spring 112 is compressed, the male coupling member 113 and the motor 116 are rotated together with the cover 120.

When the cover 120 reaches a predetermined position, the male coupling member 113 is returned to its original position by the elastic force of the coil spring 112 and engaged with the female coupling member 114, thereby allowing the cover 120 to be rapidly opened or closed.

However, the conventional folding type mobile device is problematic in that its cover 120 cannot reach a set open or closed position due to the change of the output characteristics (that is, RPM) of its motor 116 because the motor 116 is operated by its timer for a predetermined time period.

In addition, if external force is exerted on the cover 120 by the wrong operation of the switch while the cover 120 is opened or closed and is held by a hand or contained in a pocket, the male coupling member 113 is stopped at an undesired position.

Accordingly, in a manual mode, the cover 120 is not fully closed or opened at 150° or more, so the opening and closing of the cover 120 is not desirably performed.

SUMMARY OF THE INVENTION

Accordingly, the present invention has been made keeping in mind the above problems occurring in the prior art, and an object of the present invention is to provide an apparatus for operating the cover of a mobile device, which is capable of selectively and desirably opening and closing the cover by compensating for a change in the output characteristics of its operating means and a difference in phase due to both automatic and manual use.

In order to accomplish the above object, the present invention provides an apparatus for operating the cover of a mobile device, comprising: a cylindrical housing formed on one end of the device cover, the cylindrical housing accommodating an operating means, the cylindrical housing having a projection at its first side and being open at its second side; two holding projections integrated with a device body, the holding projections having opposite holding recesses and rotatably supporting the cylindrical housing; a hinge shaft connected to the output end of the operating means, the cam portion of which is inserted into one of the holding recesses; elasticity means situated in the holding recess into which the cam portion is inserted for exerting a predetermined amount of elastic force on the cam portion; a switch formed on one side of the device body for applying an operating signal to the operating means; and position sensing means comprised of a brush housing and a rectification housing attached to the operating means and the hinge shaft at opposite positions for detecting the same phase state when the first and second patterns of the rectification housing are electrically connected and applied with electricity at certain positions by the brush of the brush housing.

The position sensing means may comprise: a brush housing fixedly attached to the output end of the operating means, from which a brush is projected; and a rectification housing on which the first and second patterns are formed to be applied with electricity by electric contact with the brush; wherein the same phase state is detected when the first and second patterns are electrically connected and applied with electricity at certain positions by the brush during the relative rotation of the brush housing and the rectification housing due to the rotation of the operating means.

The brush housing may be provided with one or more brushes.

The first and second patterns of the rectification housing may be formed symmetrically and applied with electricity by the brush of the brush housing at angles of 90° and 270°.

The position sensing means may comprise: a rectification housing fixedly attached to the output end of the operating means, on one surface of which the first and second patterns are formed to be applied with electricity; a brush housing fixedly attached to the hinge shaft at the position opposite to the rectification housing and provided with a brush for connecting and applying electricity to the first and second patterns; wherein the same phase state is detected when the first and second patterns are electrically connected and applied with electricity at certain positions by the brush during the relative rotation of the rectification housing and the brush housing due to the rotation of the operating means.

The first and second patterns of the rectification housing may be formed symmetrically and applied with electricity by the brush of the brush housing at angles of 90° and 270°.

The operating means may be a motor connected to a switch to produce the rotating force of a forward or reverse direction.

The operation of the operating means may be controlled by the application of electricity that occurs when a brush housing and a rectification housing have the same phase.

The elasticity means may be a pair of springs that are arranged and spaced in a holding recess to which the hinge shaft is inserted and support the cam portion of the hinge shaft.

The first and second patterns of the rectification housing may be comprised of inner and outer concentric patterns that are spaced apart by a predetermined interval and applied with electricity by the brush of the brush housing at angles of 90° and 270°.

The first and second patterns of the rectification housing may be comprised of inner and outer concentric patterns that are spaced apart by a predetermined interval and applied with electricity by the brush of the brush housing at angles of 90° and 270°.

The apparatus may further comprise a dummy pattern between the patterns, the dummy pattern being connected to one of the patterns.

The brush may have two contact branches.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention relates to an apparatus for operating the cover of a folding type mobile device, and particularly to an apparatus for operating the cover of an folding type mobile device, which is capable of selectively opening and closing the cover at stable positions by compensating for the instability of the apparatus and the phase difference due to a load by the control of position of the cover.

Figure 1:
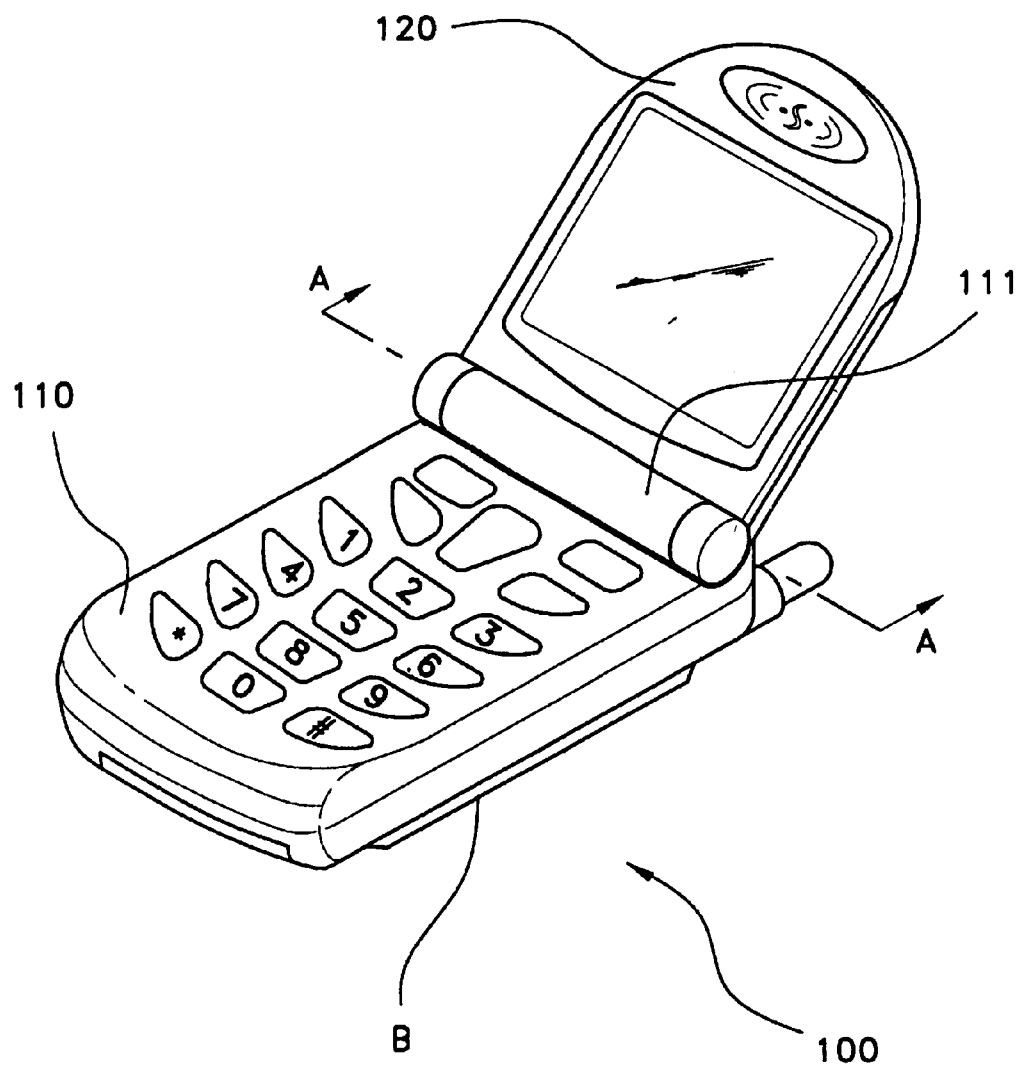
FIG. 1 is a perspective view of a conventional folding type mobile device.
Figure 2:
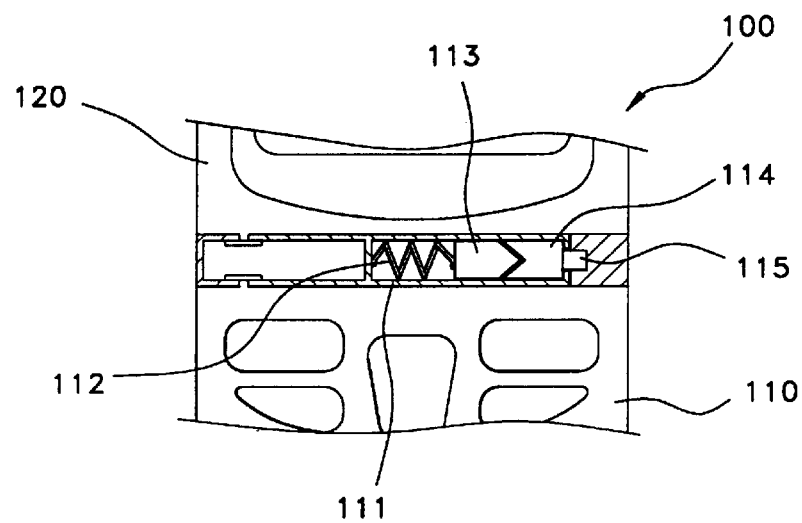
FIG. 2 is a cross section taken along line A—A of FIG. 1.
Figure 3:
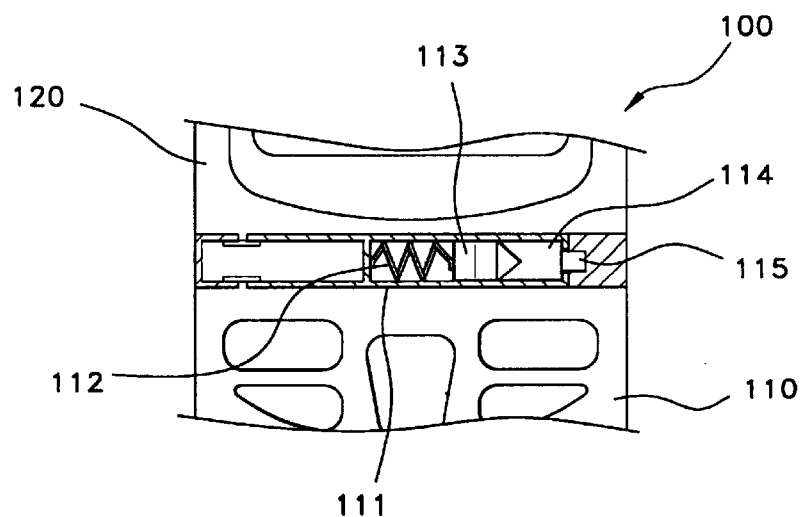
FIG. 3 is a cross section showing the operation of the conventional folding type mobile device.
Figure 4:
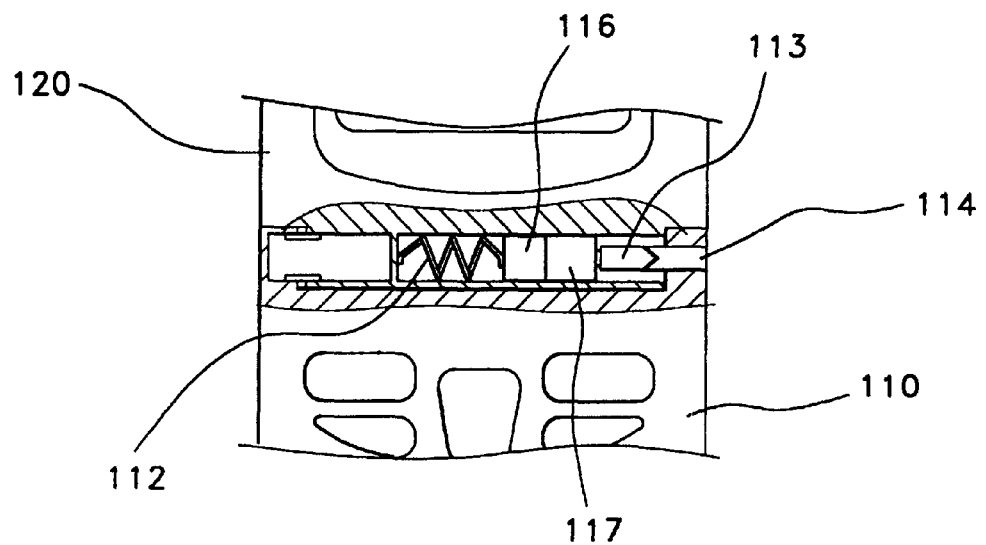
FIG. 4 is a partially sectional view showing a principal portion of another conventional folding type mobile device with an operating apparatus.
Figure 5:
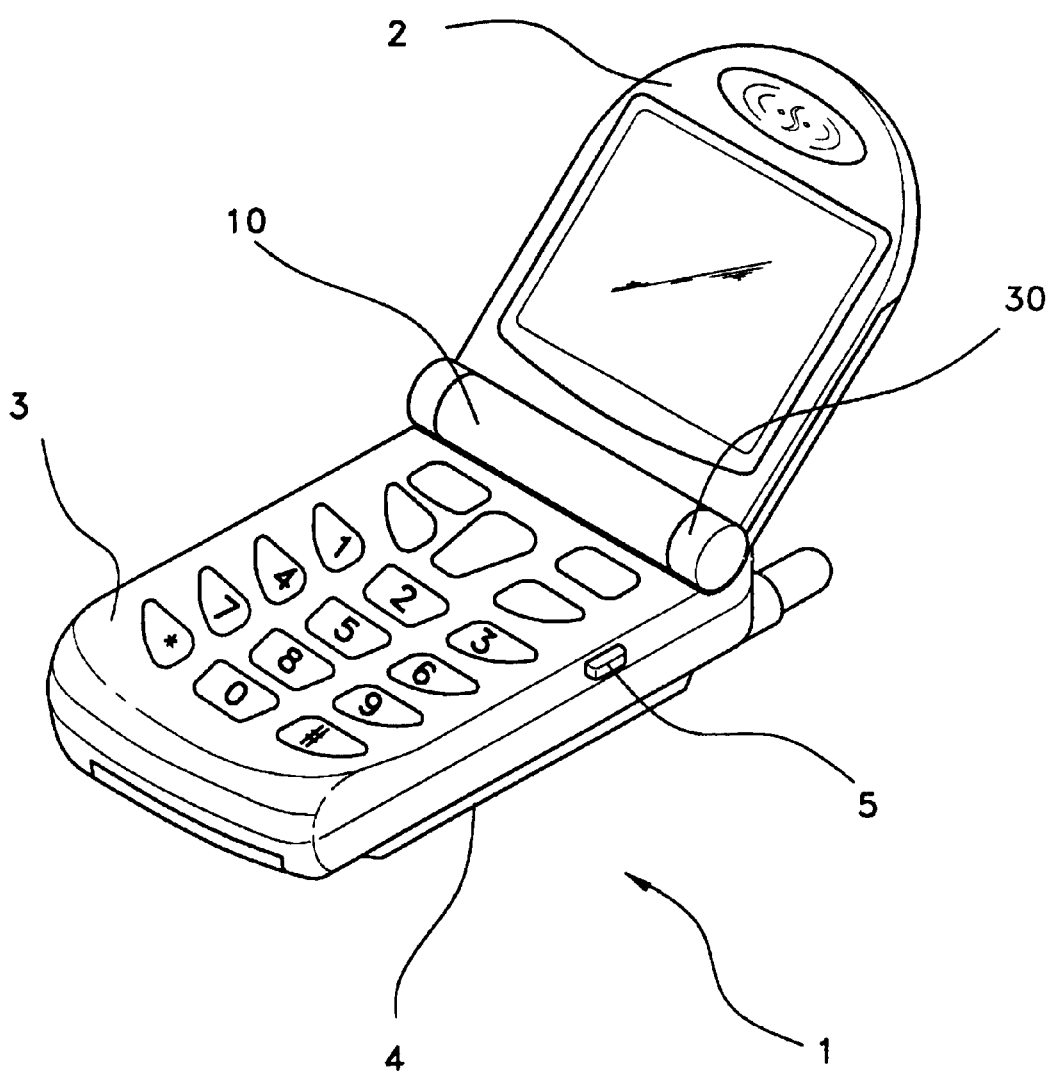
FIG. 5 is a perspective view showing a folding type mobile device in accordance with the present invention.

FIG. 5 is a perspective view showing a folding type mobile device in accordance with the present invention. FIGS. 6 to 9 are partially sectional views showing an apparatus for operating the cover of the folding type mobile device in accordance with the present invention.

The apparatus for operating the cover of the folding type mobile device is basically comprised of operating means 11 mounted in a hollow cylindrical housing 10, a hinge shaft 60 connected to the operating means 11, springs 40 exerting a predetermined amount of elastic force on the hinge shaft 60, and position sensing means 50.

The operating means 11 is mounted in the hollow cylindrical housing 10 that is formed at the lower end of the cover 2 connected to the upper portion of the device body 3, and serves to generate operating force for rotating the cover 2. The operating means 11 is basically comprised of a motor 12 and a speed reduction gear 13. In this case, the motor 12 generates a predetermined amount of rotating force in forward and reverse directions by the manipulation of a switch. The motor 12 is operated by power supplied from a battery pack 4 mounted to a folding type mobile device.

The speed reduction gear 13 is connected to the output end of the motor 12, and serves to speed-reduce the rotating force of the motor 12. The speed reduction gear 13 can be comprised of a plurality of planetary gears. The planetary gears have a predetermined amount of speed reduction ratio, and can perform speed reduction and reversion prevention functions simultaneously.

The operating means 11 allows operating force generated in the motor 12 to the hinge shaft 60 through the planetary gears in a speed-reduced state.

The hinge shaft 60 is connected to the output end of the operating means 11, and provided at its outer end with a rectangular cam portion 61. The cam portion 61 is inserted into a holding recess 31 formed on a holding projection 30 that faces the open end of the cylindrical housing 10, and is elastically supported by the springs 40.

The springs 40 are made of material having a superior elastic strain and restoring force. A pair of plate springs are employed as the springs 40, which are spaced apart from each other and inserted into the holding recess 31 into which the cam portion 61 of the hinge shaft 60 is inserted. The plate springs elastically support the cam portion 61 of the hinge shaft 60 while the cam portion is disposed between the plate springs.

In this case, the interval between the plate springs is determined to be commensurate with the smallest width of the cam portion 61. When the cam portion 61 is rotated, the plate springs are extended by the greatest width of the cam portion 61.

As a result, while the hinge shaft 60 is elastically supported by the elastic support force of the springs 40 such as the plate springs, the following operation is performed. That is, in an automatic mode, as the motor 12 is rotated around the hinge shaft 60, the cover 2 to which the operating means 11 are secured is rotated together with the operating means 11. In a manual mode, the hinge shaft 60 is prevented from being reversed by the speed reduction gear. Accordingly, while the cover 2 is selectively and manually opened and closed, the hinge shaft 60 is rotated together with the cover 2 and deforms the springs 40.

The switch 5 serves to actuate the operating means 11 by the manipulation of a user. When the switch 5 is manipulated by the user, predetermined electric signals are output to the motor 12 connected to the output end of the switch 5.

The switch 5 may be a general on/off type switch formed on one side surface of the device body 3. The switch 5 can be provided in various manners according to the shapes of the mobile device and the mounting positions of the switch 5.

Additionally, the forward and reverse operations of the operating means are controlled in such a way that according to the manipulation of the switch 5, the cover 2 is opened when closed, and closed when opened.

The position sensing means 50 is mounted on the opposite positions of the operating means 11 and the hinge shaft 60. The position sensing means 50 is comprised of a rectification housing 51 and a brush housing 52. The rectification housing 51 includes a first conductive pattern (hereinafter, referred to as "first pattern") 51a positive in polarity and a second conductive pattern (hereinafter, referred to as "second pattern) 51b negative in polarity, and the brush housing 52a includes a brush 52a, so as to perform the application of electricity at a predetermined angle. The rectification housing 51 and the brush housing 52 are constructed to detect as the same phase state a state in which the first and second patterns 51a and 51b of the rectification housing 51 fixedly attached to the operating means 11 and rotated together with the operating means 11 are brought into contact with the brush 52a of the brush housing 52 fixedly attached to the hinge shaft 60 and the application of electricity occurs, and to input this the operating means 11.

In more detail, the position sensing means 50 controls the operating means 11 after sensing the state in which the cylindrical housing 10 and the hinge shaft 60 has the same phase, that is, the state the first and second patterns 51a and 51b of the rectification housing 51 fixedly attached to operating means 11 fixedly mounted in the cylindrical housing 10 are connected to each other by the brush 52a of the brush housing 52 fixedly attached to the hinge shaft 60 and the application of electricity occurs, or the state in which the brush 52a of the brush housing 52 fixedly attached to the operating means 11 electrically connects the first and second patterns 51a and 51b of the rectification housing 51 fixedly attached to the hinge shaft 60 to each other and allows the application of electricity to occur.

Figure 6:
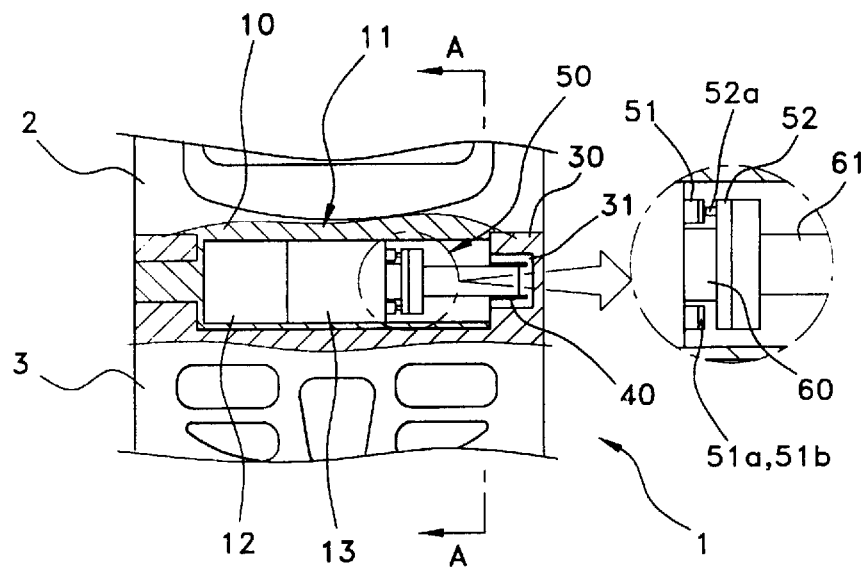
FIGS. 6 and 7 are cross sections showing an apparatus for operating the cover of the folding type mobile device in accordance with the present invention.
Figure 7:
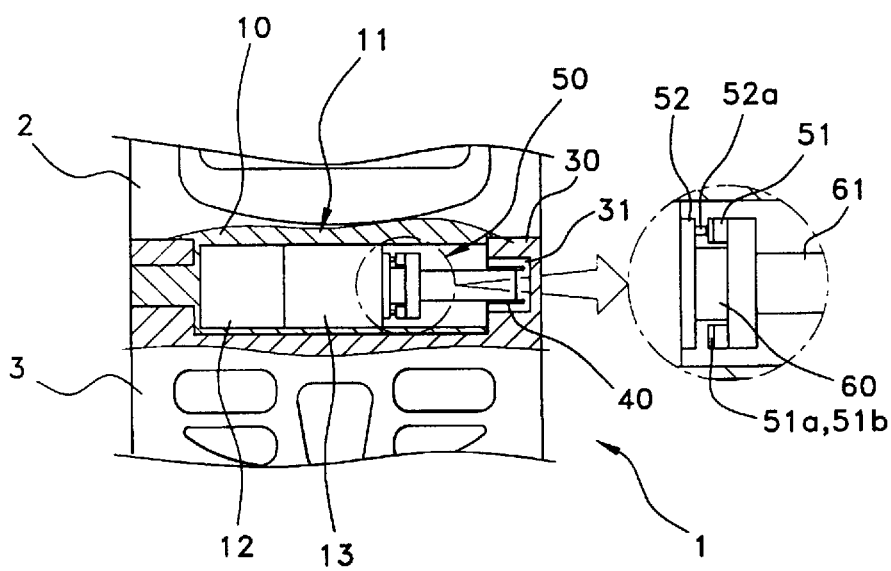
Figure 8:
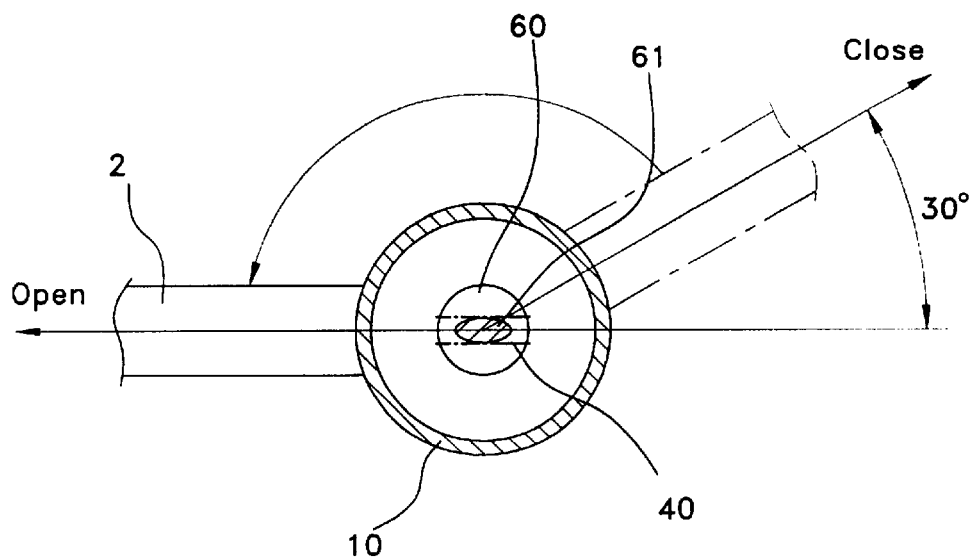
FIG. 8 is a cross section taken along line A—A of FIG. 6.

The rectification housing 51 and the brush housing 52 of the position sensing means 50 can be arranged as illustrated in FIGS. 6 and 7 so as to detect information on whether the cylindrical housing 10 and the holding projection 30 has the same phase or not.

As depicted in FIG. 6, the position sensing means 50 can be constructed in such a way that the rectification housing 51 is mounted on one side of the operating means 11 and the brush housing 52 is mounted on the side of the hinge shaft 60 opposite to the former side so that there can be detected information on the same phase.

In this case, the rectification housing 51 can be made of a plate-shaped thin film member. The first pattern 51a positive in polarity and the second pattern 51b negative in polarity, or the first pattern 51a negative in polarity and the second pattern 51b positive in polarity are formed on the surface of the rectification housing 51 facing the brushing housing 52 so as to be applied with electricity.

One or more brushes 52a shaped in the forms of steel strips are attached to the brush housing 52 secured to the hinge shaft 60 so as to connect and apply electricity to the first and second patterns 51a and 51b.

A central hole (not shown) having a predetermined size is formed to allow the hinge shaft 60 to pass through the rectification housing 51 and brush housing 52.

As depicted in FIG. 7, the position sensing means 50 can be constructed in such a way that the brush housing 52 is mounted on one side of the speed reduction gear 13 of the operating means 11 and the rectification housing 51 is mounted on the side of the hinge shaft 60 opposite to the former side so that there can be detected information as to the same phase.

In such a case, the brush housing 52 is provided on its one side surface with one or more brushes 52a. The brushes 52a generally are one or more, and are bent at their first ends so as to come into stable contact with one surface of the rectification housing 51.

The first pattern 51a positive in polarity and the second pattern 51b negative in polarity, or the first pattern 51a negative in polarity and the second pattern 51b positive in polarity are formed on one surface of the rectification housing 51 so as to allow electricity to be applied by electrical contact with the brush 52a of the brush housing 52. A central hole (not shown) having a predetermined size is formed so as to receive the hinge shaft 60.

Figure 10:
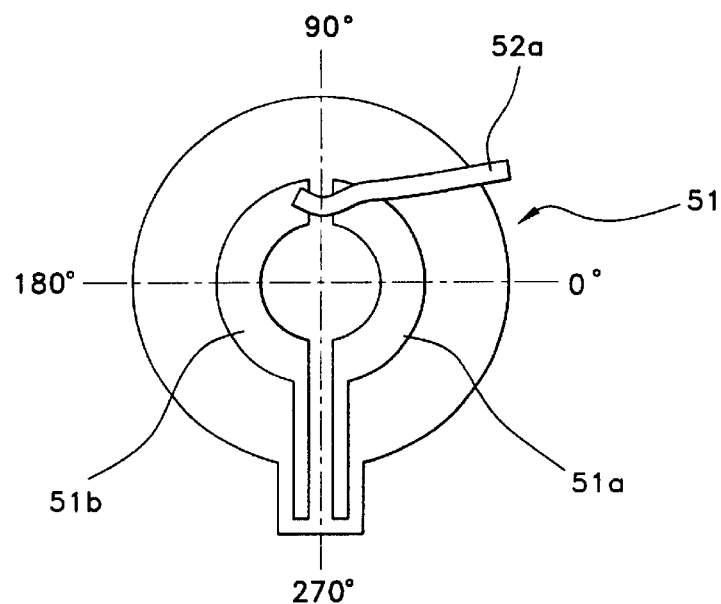
FIGS. 10 and 11 are views showing position sensing means in accordance with the present invention.
Figure 11:
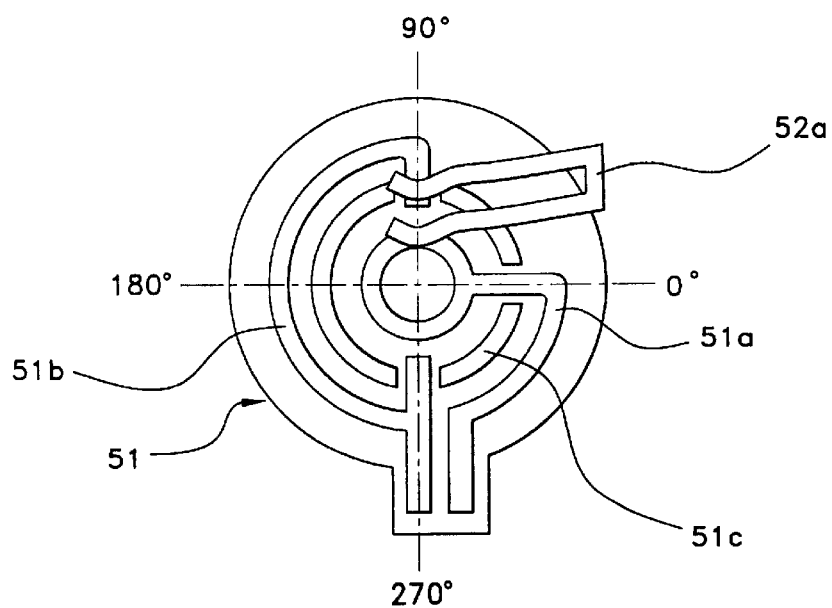

The position sensing means 50 can be constructed as shown in FIGS. 10 and 11. In the position sensing means 50, the rectification housing 51 is on its one surface with the first pattern 51a positive in polarity and the second pattern 51b negative in polarity, or the first pattern 51a negative in polarity and the second pattern 51b positive in polarity, and the brush housing 52 is provided with one or more brushes 52a so as to produce the application of electricity at predetermined angles by electrically connecting the first and second patterns 51a and 51b of the rectification housing 51.

That is, in FIG. 10, there are illustrated a single brush 52a with which the brush housing 52 is provided and the rectification housing 51 that is provided with the first and second patterns 51a and 51b so as to be applied with electricity at angles of 90° and 270° by contact with the brush 52a.

In this case, the shapes of the first and second patterns 51a and 51b formed on the rectification housing 51 are not restricted to the above-described shapes, but can be shaped in various shapes. As shown in FIG. 11, by way of example, the first and second patterns 51a and 51b formed on the rectification housing 51 are concentric, and formed separately into inner and outer patterns spaced apart from each other. The application of electricity is carried out at angles of 90° and 270° through the patterns 51a and 51b and the brush housing 52.

In the meantime, when the inner and outer patterns are formed as described above, the patterns are applied with electricity by the brush 52a of the brush housing 52 at angles of 90° and 270°. As a result, the brush 52a is not supported at an uniform height, so a dummy pattern 51c is formed between the inner and outer patterns so as to achieve smooth contact between the patterns and the brush 52a.

When the first and second patterns 51a and 51b of the rectification housing 51 form inner and outer concentric patterns, the brush 52a of the brush housing 52 should form a brush that are branched into two.

The brush 52a of the brush housing 52 is formed of a steel strip. One end of the brush 52a is bent so as to be brought into contact with the first and second patterns 51a and 51b of the rectification housing 51.

Hereinafter, the operation of the apparatus for operating the cover of the folding type mobile device is described.

The description is performed on the basis of the position sensing means 50.

When a user rotates the cover 2 in a forward or reverse direction so as to manually open or close the cover 2, the cylindrical housing 10 is rotated in a forward or reverse direction together with the cover 2. Additionally, the hinge shaft 60 mounted in the cylindrical housing 10 is rotated together with the cover 2 and the cylindrical housing 10.

In this case, since the speed reduction gear 13 of the operating means 11 prevents reversion, the cam portion 61 of the hinge shaft 60 is rotated while forcibly extending the springs 40.

As a result, the rotating force produced by the cover manipulated by the user causes the springs supporting the cam portion 61 of the hinge shaft 60 to be elastically extended, thereby causing the cover 2 to be manually opened and closed.

Meanwhile, when the switch 5 is manipulated so as to automatically open the cover 2, the switch 5 causes a predetermined electric signal to be applied to the motor 12 of the operating means 11.

The motor 12 receives power from the battery pack 4 mounted to the mobile device 1 and generates a predetermined amount of rotating force to open the cover 2. The rotating force of the motor 12 is speed-reduced through the speed reduction gear 13 by a predetermined speed reduction ratio, and is transmitted to the hinge shaft 60 attached to the output end of the speed reduction gear 13.

Figure 9:
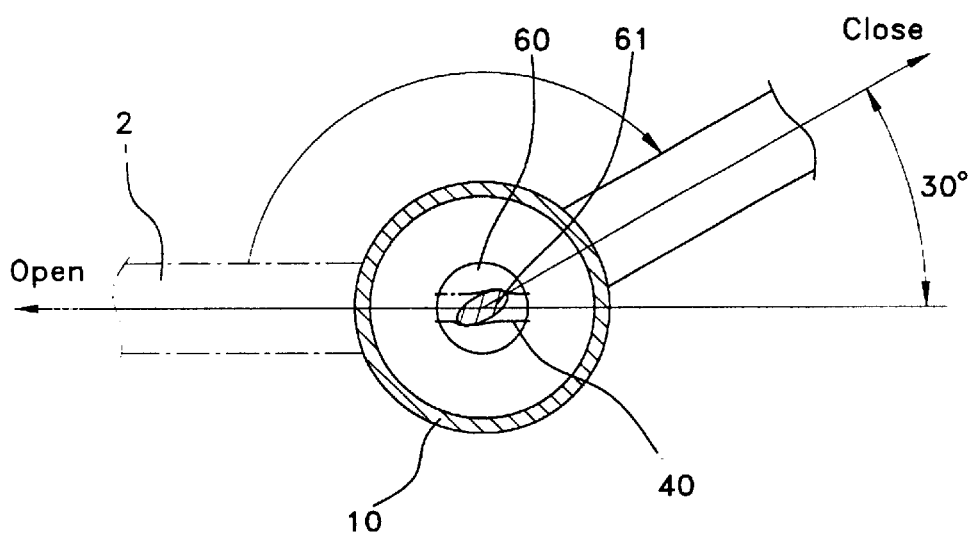
FIG. 9 is a cross section similar to FIG. 8.

When the cover 2 is closed over the device body 3, the cam portion 61, as illustrated in FIG. 9, has the phase of being tilted and extending the spring 40. In this state, the restoring force of the spring 40 is exerted on the cam portion 61, so the cover 3 is closed while being situated under the restoring force of the spring 40. Accordingly, when the motor 12 generates rotating force oriented in the direction of opening the cover 2, the cam portion 61 is easily returned to its horizontality with the aid of the restoring force of the spring 40.

Consequently, the cam portion 61 is elastically supported and fixed by the springs 40 inserted into the holding recess 31 of the holding projection 30, so the hinge shaft 60 is not rotated but the operating means is rotated.

As a result, the cover 2 provided with the cylindrical housing 10 into which the operating means 11 is mounted is rotated in a direction into an open position.

When the rectification housing 51 attached to the operating means 11 and the brush housing 52 attached to the hinge shaft 60 have the same phase while the hinge shaft 60 is rotated, a predetermined electric signal is applied to the motor 12, thereby stopping the motor 12 and completing the opening of the cover 2.

Meanwhile, when the user manipulates the switch 5 attached to one side of the device body 3 so as to automatically close the cover 2, a predetermined electric signal produced from the switch 5 is applied to the motor 12 of the operating means 11.

The motor 12 receives power from the battery pack 4 mounted on the mobile device 1 and generates a predetermined amount of rotating force to close the cover 2. The rotating force of the motor 12 is speed-reduced through the speed reduction gear 13 by a predetermined speed reduction ratio, and is transmitted to the hinge shaft 60 attached to the output end of the speed reduction gear 13.

In this case, the cam portion 61 is elastically supported and fixed by the springs 40 inserted into the holding recess 31 of the holding projection 30, so the hinge shaft 60 is not rotated but the operating means is rotated.

Accordingly, the operating means 11 is mounted to the cylindrical housing 10 of the cover 2, so the cover 2 is rotated in the reverse direction into a closed position.

In this case, when the cover 2 reaches a closed position, the cover 2 is not rotated further by contact with the device body 3. At this time, a load is exerted on the operating means 11, and, at the same time, the cam portion 61 of the hinge shaft 60 overcomes the elastic force of the springs 40 and is rotated.

Subsequently, as the hinge shaft 60 is rotated, the rectification housing 51 and the brush housing 52 are applied with electricity by the first and second patterns 51a and 51b of the rectification housing 51.

As a result, the position sensing means 50 applies a predetermined electric signal regarding detection of the same phase to the motor 12 and stops the motor 12, thereby completing the closing of the cover 2.

This is described in more detail, hereinafter.

When a user manipulates the switch 5 so as to close the cover 2 while a rectification housing 51 is attached to the operating means 11 and the brush housing 52 is attached to the hinge shaft 60, the operating means 11 is operated and the cover 2 is rotated to its closed position. The operating means 11 mounted in the cover 2 is rotated together with the cover 2, and the rectification housing 51 attached to the operating means 11 is operated together with the operating means 11.

In this case, the first pattern 51a positive in polarity and the second pattern 51b negative in polarity are formed on the rectification housing 51 attached to the operation means 11.

Meanwhile, when the cover 2 is not rotated further because it is completely closed, load is exerted on the closed cover 2. At this time, the motor 12 is continuously operated, so the hinge shaft 60 overcomes the elastic force of the elasticity means and is rotated at a predetermined angle. The brush housing 52 fixedly attached to the hinge shaft 60 is rotated together with the hinge shaft 60.

Accordingly, the brush 52a with its one end being fixed and its other end being kept free and connecting the first and second patterns 51a and 51b of the rectification housing 51 is rotated together with the brush housing 52, so the first and second patterns 51a and 51b fixedly attached to the operating means 11 are electrically connected to each other and applied with electricity.

The motor 12 of the operating means 11 is stopped by such application of electricity, and has the above-described "same phase". At this time, the cam portion 61 of the hinge shaft 60 is elastically supported by the springs 40.

In the meantime, when the user manipulates the switch 5 so as to open the cover 2, the operating means 11 is operated and the hinge shaft 60 is rotated at a predetermined angle in the direction opposite to the direction in which the cover 2 is opened. Thereafter, the hinge shaft 60 is stopped by the plate springs 40 and the cover 2 is rotated in the direction in which the cover 2 is opened. At this time, the operating means 11 fixedly attached to the cover 2 is rotated together with the cover 2, and the rectification housing 51 fixedly attached to the operating means 11 is rotated together with the operating means 11.

In this case, the first and second patterns 51a and 51b applied with electricity by the brush 52a are formed on the rectification housing 51 fixedly attached to the operating means 11, the brush 52a, one free end of which is capable of electrically connecting and applying electricity to the first and second patterns 51a and 51b, is fixedly attached at its other end to the brush housing 52 secured to the hinge shaft 60.

Accordingly, when the cover 2 is rotated at a fully opened angle, the brush 52a electrically connects and applies electricity to the first and second patterns 51a and 51b. The motor 12 of the operating means 11 is stopped by such application of electricity. This state is the above-described "same phase" state, and the hinge shaft 60 is situated at a position that minimizes the interval between the springs 40.

As illustrated in FIG. 7, a user manipulates the switch 5 to close the cover 2 while the brush housing 52 is secured to the operating means 11 and the rectification housing 51 is secured to the hinge shaft 60, the cover 2 is rotated in the direction in which the cover 2 is closed by the operation of the operating means 11, the operating means 11 fixedly attached to the cover 2 is rotated together with the cover 2, and the brush housing 52 fixedly attached to the operating means 11 is rotated together with the operating means 11.

At this time, the brush 52a, one free end of which electrically connects and applied electricity to the first and second patterns 51a and 51b of the rectification housing 51, is fixedly attached to the brush housing 52 secured to the operating means 11 at its other end.

Meanwhile, when the cover 2 is not rotated further because it is completely closed, load is exerted on the closed cover 2. At this time, the motor 12 is continuously operated, so the hinge shaft 60 overcomes the elastic force of the elasticity means or the springs 40 and is rotated at a predetermined angle. The rectification housing 51 fixedly attached to the hinge shaft 60 is rotated together with the hinge shaft 60.

Accordingly, the first and second patterns 51a and 51b fixedly attached to the rectification housing 51 are electrically connected to each other and applied with electricity by the brush 52a fixedly attached to the operating means 11 and stopped. The motor 12 of the operating means 11 is stopped by such application of electricity. This state is the above-described "same phase". At this time, the cam portion 61 of the hinge shaft 60 is elastically supported by the springs 40.

In the meantime, when the user manipulates the switch 5 so as to open the cover 2, the operating means 11 is operated and the hinge shaft 60 is rotated at a predetermined angle (that minimizes the interval between plate springs) in the direction opposite to the direction in which the cover 2 is opened. Thereafter, the hinge shaft 60 is stopped by the plate springs and the cover 2 is rotated in the direction in which the cover 2 is opened.

At this time, the operating means 11 fixedly attached to the cover 2 is rotated together with the cover 2, and the brush housing 52 fixedly attached to the operating means 11 is rotated together with the operating means 11.

Additionally, the brush 52a, the free end of which electrically connects and applies electricity to the first and second patterns 51a and 51b, is fixedly attached at its one end to the brush housing 52 secured to the operating means 11.

Accordingly, when the cover 2 is rotated at a fully opened angle, the brush 52a electrically connects and applies electricity to the first and second patterns 51a and 51b.

The motor 12 of the operating means 11 is stopped by such application of electricity. This state is the above-described "same phase" state.

Meanwhile, when load is exerted while the cover 2 is opened in an automatic mode, the cover 2 is fixed and the hinge shaft 60 overcomes the elastic support force of the springs 40 and is rotated.

Accordingly, the first and second patterns 51a and 51b of the rectification housing 51 are electrically connected to each other by the brush 52a of the brush housing 52, so the motor 12 is stopped and the hinge shaft 60 and the cover 2 have the same positions as those in a manual mode.

Hence, the cover 2 is moved to the more rear one of open and closed positions by the elastic restoring force of the springs 40, and opened or closed.

Meanwhile, when load is exerted while the cover 2 is closed in an automatic mode, the cover 2 is opened and closed in the above-described manner.

Accordingly, in accordance with the present invention, the cover 2 is automatically moved to its initial or open position even when external force is exerted during the automatic opening and closing of the cover 2, so the continuity of operation is guaranteed.

In particular, in the present invention described above, the rectification housing 51 and the brush housing 52 are arranged within the space defined by the cylindrical housing 10 and the holding projection 30 where the cover 2 and the device body 3 are connected to each other, and the operation of the motor 12 is controlled by the electricity application signal of the rectification housing 51 and the brush housing 52 that are electrically connected to each other at a certain relative angle, thereby compensating for the unstable operating force of the motor 12 and a phase difference due to load.

In the apparatus for operating the cover of a folding type mobile device, the continuity of operation is guaranteed because its cover is automatically moved to its initial or open position even when external force is exerted during the automatic opening and closing of the cover, and the reliability of operation is improved because the cover is opened and closed at appropriate positions by position sensing means. Although the present invention is described and illustrated as being applied to folding type mobile devices for ease of description and illustration, the present invention is not restricted to the folding type mobile devices but can be applied to various mobile communication devices and portable electronic products with covers or flips hingedly attached to their bodies.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for operating the cover of a mobile device, comprising:
   a cylindrical housing formed on one end of the device cover, said cylindrical housing accommodating an operating means, said cylindrical housing having a projection at its first side and being open at its second side;
   two holding projections integrated with a device body, said holding projections having opposite holding recesses and rotatably supporting said cylindrical housing;
   a hinge shaft connected to the output end of said operating means, the cam portion of which is inserted into one of said holding recesses;
   elasticity means situated in said holding recess into which the cam portion is inserted for exerting a predetermined amount of elastic force on said cam portion;
   a switch formed on one side of said device body for applying an operating signal to said operating means; and
   position sensing means comprised of a brush housing and a rectification housing attached to said operating means and said hinge shaft at opposite positions for detecting the same phase state when the first and second patterns of said rectification housing are electrically connected and applied with electricity at certain positions by a brush of said brush housing.

2. The apparatus according to claim 1, wherein said position sensing means comprises:
   a brush housing fixedly attached to the output end of said operating means, from which a brush is projected; and
   a rectification housing on which the first and second patterns are formed to be applied with electricity by electric contact with said brush;
   wherein the same phase state is detected when said first and second patterns are electrically connected and applied with electricity at certain positions by said brush during the relative rotation of said brush housing and said rectification housing due to the rotation of said operating means.

3. The apparatus according to claim 2, wherein the first and second patterns of said rectification housing are formed symmetrically and applied with electricity by the brush of said brush housing at angles of 90° and 270°.

4. The apparatus according to claim 3, wherein said first and second patterns of the rectification housing are comprised of inner and outer concentric patterns that are spaced apart by a predetermined interval and applied with electricity by the brush of said brush housing at angles of 90° to 270°.

5. The apparatus according to claim 4, wherein said brush has two contact branches.

6. The apparatus according to claim 4, further comprising a dummy pattern between said patterns, said dummy pattern being connected to one of said patterns.

7. The apparatus according to claim 1, wherein said brush housing is provided with one or more brushes.

8. The apparatus according to claim 1, wherein said position sensing means comprises:

a rectification housing fixedly attached to the output end of said operating means, on one surface of which the first and second patterns are formed to be applied with electricity;

a brush housing fixedly attached to said hinge shaft at the position opposite to said rectification housing and provided with a brush for connecting and electrifying said first and second patterns;

wherein the same phase state is detected when said first and second patterns are electrically connected and applied with electricity at certain positions by said brush during the relative rotation of said rectification housing and said brush housing due to the rotation of said operating means.

9. The apparatus according to claim 8, wherein said first and second patterns of the rectification housing are formed symmetrically and applied with electricity by the brush of said brush housing at angles of 90° to 270°.

10. The apparatus according to claim 9, wherein said first and second patterns of the rectification housing are comprised of inner and outer concentric patterns that are spaced apart by a predetermined interval and applied with electricity by the brush of said brush housing at angles of 90° to 270°.

11. The apparatus according to claim 1, wherein said operating means is a motor connected to a switch to produce the rotating force of a forward or reverse direction.

12. The apparatus according to claim 1, wherein the operation of said operating means is controlled by the application of electricity that is performed when a brush housing and a rectification housing have the same phase.

13. The apparatus according to claim 1, wherein said elasticity means are a pair of springs that are arranged and spaced in a holding recess to which said hinge shaft is inserted and support the cam portion of said hinge shaft.

* * * * *